3,326,983
PREPARATION OF NITRATED AROMATIC COMPOUNDS BY NITRATING IN THE PRESENCE OF HYDROGEN FLUORIDE AND AN ALKALI METAL FLUORIDE
Jerome A. Vesely, Park Ridge, Ill., and Carl B. Linn, Prairie Village, Kans., assignors to Universal Oil Products Company, Des Plaines, Ill., a corporation of Delaware
No Drawing. Filed Dec. 6, 1965, Ser. No. 511,997
10 Claims. (Cl. 260—612)

This invention relates to a process for the nitration of aromatic compounds. More particularly, the invention is concerned with a process whereby improved yields of a desired isomeric nitrated aromatic compound may be obtained.

Heretofore, the nitration of certain aromatic compounds and particularly those which contain various reactive substituents on the ring has been accomplished with difficulty. This is due to the fact that such compounds possess so much reactivity concerning certain substituents that during the conventional nitration process which consists of nitrating said compounds with a nitration agent in the presence of sulfuric acid, the compounds are destroyed and therefore no pure products can be isolated from the reaction mixture. In addition, when the nitration results in the obtention of a dinitro compound or a mononitrated aromatic compound, the isomers which are obtained thereby, namely, an ortho-nitrated product and a para-nitrated product are obtained in a certain ratio. In this respect, it is to be noted that certain aromatic compounds which possess a nitro substituent in a position ortho to the substituted position will comprise the more desired compound.

It is therefore an object of this invention to provide a process for the nitration of aromatic compounds utilizing a novel nitration medium.

A further object of this invention is to provide a novel process for the nitration of aromatic compounds whereby the ratio of ortho to para isomers will be greatly enhanced.

In one aspect, an embodiment of this invention resides in a process for the enhancement of the ortho nitration of an aromatic compound which comprises treating said aromatic compound with a nitrating agent in the presence of hydrogen fluoride and an alkali metal fluoride at nitrating conditions which include a temperature in the range of from about $-75°$ to about $30°$ C., and recovering the resultant nitrated aromatic compound.

A specific embodiment of this invention is found in a process for the enhancement of the ortho nitration of the aromatic compound which comprises treating chlorobenzene with nitric acid in the presence of hydrogen fluoride and sodium fluoride at a temperature in the range of from about $-75°$ to about $30°$ C. and recovering the resultant nitrated chlorobenzenes in which said nitrated chlorobenzene comprises a major portion of o-nitrochlorobenzene and a minor portion of p-nitrochlorobenzene.

Other objects and embodiments will be found in the following further detailed description of this invention.

As hereinbefore set forth, the present invention is concerned with a process for the nitration of aromatic compounds and particularly to a process for obtaining improved yields of aromatic compounds in which the nitro substituent is on a position ortho to a second nitro substituent or to a substituent which was originally present on the aromatic compound. The nitrated aromatic compounds thus produced will find a wide variety of uses in the chemical field. One particular use for these nitrated compounds is as intermediates in the preparation of reductively alkylated compounds which are useful as antioxidants and antiozidants. These compounds will protect various oils such as fuel, gasoline, etc.; foods such as butter, vegetable oils, fish oils, cheeses, etc.; and rubbers such as natural rubber or synthetic rubber against deterioration with an accompanying formation of gums, rancidity or cracking, said deterioration depending upon the particular substrate.

Examples of aromatic compounds which may undergo nitration according to the process of this invention will include hydrocarbons such as benzene, naphthalene, anthracene, crysene, etc.; halo aromatic compounds such as chlorobenzene, bromobenzene, iodobenzene, 1-chloronaphthalene, 2-chloronaphthalene, 1-bromonaphthalene, 2 - bromonaphthalene, 1 - chloroanthracene, 1 - bromoanthracene, etc.; alkyl aromatic compounds such as toluene, ethylbenzene, 1-methylnaphthalene, 1-ethylnaphthalene, 1-methylanthracene, 1-methylcrysene, etc.; alkoxy substituted aromatic compounds such as cresol, phenetol, 1-methoxynaphthalene, 1-ethoxynaphthalene, etc.; aromatic amino compounds and their derivatives such as acetanilide, N-acetyldiphenylamine, etc.; noncondensed polycyclic aromatics such as diphenylether, etc. It is to be understood that the aforementioned compounds are only representative of the class of compounds which may be nitrated and that the present invention is not necessarily limited thereto.

The aforementioned aromatic compounds are nitrated by treating said compounds with a nitration agent such as nitric acid, nitrous acid, etc., in the presence of hydrogen fluoride and an alkali metal fluoride at temperatures ranging from about $=70°$ to about $30°$ C. and particularly in a range of from about $-70°$ to about $0°$ C. The hydrogen fluoride which is used may be anhydrous in nautre or may be in an aqueous solution containing at least 80% hydrogen fluoride. By utilizing these subatomspheric temperatures, the aromatic compounds and particularly those which contain reactive substituents which are highly vulnerable to destruction in a conventional nitration process which includes a system such as a mixture of nitric acid and sulfuric acid may be selectively reacted to form the desired nitrated product and may be recovered in substantially pure form without destroying the integrity of the original compound.

As hereinbefore set forth, it has now been discovered that by effecting the nitration reaction in the presence of an alkali metal fluoride it is possible to enhance the ratio of the resultant ortho nitro substituent to the para nitro substituent. For example, when nirating naphthalene in he absence of an alkali metal fluoride, the ratio of 1,8-dinitronaphthalene to 1,5-dinitronaphthalene will be 1.6:1. However, when utilizing an alkali metal fluoride the resultant ratio of 1,8-dinitronaphthalene to 1,5-dinitronaphthalene will be 2.0:1. Likewise, when nitrating chlorobenzene in the absence of an alkali metal fluoride there will be obtained about 62% para nitrochlorobenzene and 36% ortho nitrochlorobenzene. When effecting this nitration in the presence of an alkali metal fluoride the amount of para nitrochlorobenzene will be reduced to 58% with a corresponding increase of the ortho nitrochlorobenzene to 42%. The alkali metal fluoride which may be utilized to enhance the obtention of the ortho nitrated isomer will include sodium fluoride, potassium fluoride, lithium fluoride, rubidium fluoride, and cesium fluoride, the preferred alkali metal fluorides comprising sodium fluoride and potassium fluoride due to their greater availability and relatively lower cost. It is contemplated within the scope of this invention that the alkali metal fluorides will be present in the nitration system in an amount ranging from about 1% to about 10% or more, the upper limit being that which comprises a saturated solution of alkali metal fluoride dissolved in the liquid hydrogen fluoride reaction medium. Preferably speaking, the amount of alkali metal fluoride will comprise from about 1 weight percent to about 10 weight percent. It is also contemplated that the amount of nitric acid which is utilized as the nitrating agent will vary, and that varying the ratio of nitrating agent to aromatic compound makes it possible to obtain a predominant proportion of a mononitrated product or a polynitrated product.

The process of the present invention may be effected in any suitable manner and may comprise either a batch or continuous type operation. When a batch type operation is used, a quantity of the aromatic compound to be nitrated is placed in an appropriate reaction apparatus such as, for example, an autoclave equipped with stirring means. In addition, if so desired, the substantially inert organic solvent such as n-pentane may also be used. The apparatus is cooled to the desired reaction temperature utilizing a wet icebath or a Dry-Ice/acetone bath. Following this, the nitration catalyst comprising hydrogen fluoride is pressured into the apparatus. The vessel or apparatus is then maintained at the proper operating conditions of temperature and pressure while the nitration agent such as nitric acid which may comprise a 70% or 100% solution of nitric acid is slowly added thereto. Inasmuch as the reaction is exothermic in nature, it is preferred that the addition of the nitrating agent be accomplished in several increments utilizing a small amount of nitration agent in each increment. After addition of the relatively small amount of the nitrating agent the addition is discontinued and the reaction vessel allowed to return to the predetermined operating temperature. Following this, an additional amount of nitrating agent may be added thereto and the process repeated until the desired and predetermined amount of agent has been added. The reaction mixture is then stirred for an additional period of time and thereafter the vessel and contents thereof are allowed to warm to room temperature. The reaction product, usually in solid form, is recovered, subjected to separation and recovery steps well known in the art such as washing, filtering and recrystallization.

It is also contemplated within the scope of this invention that the process described herein may be effected in a continuous type of operation. When such a type of operation is used, the aromatic compound to be nitrated is continuously charged to a reaction vessel which is maintained at the proper operating conditions of temperature and pressure. The nitration catalyst or medium containing the alkali metal fluoride is also charged thereto through a separate stream and, if so desired, may be admixed with the aromatic compound prior to entry into said reactor and the resulting solution charged thereto in a single stream. The nitration agent is also charged to the reaction vessel through a separate stream in relatively small increments. Upon completion of the desired residence time, the reaction product is continuously withdrawn and separated by conventional means such as filtration at a reduced temperature from the unreacted nitrating agent, nitration catalyst and unreacted starting materials. The desired product is recovered while the latter three aforementioned components of the reaction mixture are recycled to the reaction vessel as a portion of the feed stock.

Examples of nitrated aromatic compounds which may be prepared according to the process of this invention (the o-nitro substituted compounds being in a predominant proportion of any mixtures thereof) comprise o-nitrochlorobenzene, o-nitrobromobenzene, o-nitroiodobenzene, o-nitrotoluene, o-nitroethylbenzene, o-nitrocresol, o-nitrophenetol, 1,8-dinitronaphthalene, 1-amino-8-nitronaphthalene, 1-methyl-8-nitronaphthalene, 2,2'-dinitrodiphenylamine, 2,2'-dinitrodiphenylether, p-nitrochlorobenzene, p-nitrobromobenzene, p-nitroiodobenzene, p-nitrotoluene, p-nitroethylbenzene, p-nitrocresol, p-nitrophenetol, 1,5-dinitronaphthalene, 4,4'-dinitrodiphenylether, 4,4'-dinitrodiphenylamine. It is to be understood that the aforementioned compounds are only representative of the class of nitrated aromatic compounds which may be prepared according to the process described herein in which the obtention of the o-nitro substituted isomer is greatly enhanced and that said process is not necessarily limited thereto.

The following examples are given to illustrate the process of the present invention which, however, are not intended to limit the generally broad scope of the present invention in strict accordance therewith.

*Example I*

In this example, 112 g. (1.0 mole) of chlorobenzene was sealed in a stainless steel turbomixer autoclave equipped with stirring means. In addition, the autoclave also contained 20 g. of sodium fluoride. The autoclave was cooled to approximately 0° C. by means of an icebath and 202 g. of anhydrous hydrogen fluoride was added through a line to the bottom of the turbomixer directly below the stirring means. The autoclave was then adjusted to the reaction temperature which ranged from 0° to about 8° C., following which the nitrating acid which comprised 28 g. of a 70% nitric acid solution was charged thereto. The charge volume was added to the well stirred reaction mixture in four increments over a period of about 15 minutes. The reaction was extremely rapid and exothermic and sufficient time was allowed between additions of the increments of acid for the temperature to return to that of the experiment base. Following the addition of the nitric acid the reaction mixture was continuously stirred for an additional period of 15 minutes. At the end of this time, the reaction product was recovered and 300 g. of ice which had been cooled to −80° C. was added thereto. The contents were then poured into a beaker and extracted with pentane. The aromatic-containing pentane phase was separated from the dilute hydrofluoric acid, neutralized by the addition of a base, filtered and subjected to distillation. After taking the chlorobenzene overhead, the distillation was terminated and the compositions of the bottoms were determined by infrared analysis. This infrared analysis determined that 58 weight percent of the product comprised p-nitrochlorobenzene and 42 weight percent o-nitrochlorobenzene.

*Example II*

To illustrate the effect of an alkali metal fluoride as an enhancing agent for the obtention of an ortho-nitro substituted isomer the above experiment was repeated. However, in this instance, the nitration of the chlorobenzene was effected in the absence of any alkali metal fluoride such as sodium fluoride. A turbomixer autoclave similar to that described in Example I had added thereto 112 g. of chlorobenzene. The autoclave was sealed and the temperature adjusted to a range of from 0° to about 8° C. by means of an icebath. Following this, 220 g. of an anhydrous hydrogen fluoride catalyst was added thereto. The temperature was again adjusted and the nitrating agent comprising 28 g. of a 70% nitric acid solution was added thereto during a period of 16 minutes in four increments, the temperature of the solution being maintained in the aforementioned operating range. As in the previous experiment, the reaction was fast and exothermic in nature and a sufficient length of time was allowed between addition of the nitrating agent to permit the temperature to return to the desired level. At the end of this time, the reaction mixture was recovered and treated in a manner similar to that hereinbefore set forth in Example I above. Infrared analysis of the bottoms disclosed the presence of 62 weight percent of p-nitrochlorobenzene and only 36 weight percent of o-nitrochlorobenzene.

It is therefore readily apparent that the presence of an alkali metal fluoride in the reaction medium will result in an increased yield of an ortho isomer with a corresponding decreased yield of the para isomer.

*Example III*

In this example, an autoclave of the type hereinbefore described had charged thereto 92 g. (1.0 mole) of toluene and 33 g. of sodium fluoride. The autoclave was sealed and cooled to a temperature of about 0° and maintained in a range of from about 0° to about 5° C. while 207 g. of anhydrous hydrogen fluoride was charged thereto. Following this, 29 g. of a 70% nitric acid solution was added thereto in four increments allowing sufficient time between the addition of each increment to maintain the temperature at the desired operating range. The reaction mixture at the completion of the addition of the nitrating agent had a toluene/nitric acid mole ratio of 3.1:1. At the end of 1 hour, during which time the reaction mixture was continuously stirred, the reaction product was recovered and after treatment in a manner similar to that hereinbefore set forth, the bottoms were subjected to infrared analysis. This analysis disclosed the obtention of 23.4 g. of o-nitrotoluene and 12.6 g. of p-nitrotoluene which gave a ratio of 1.8:1 of ortho-nitrotoluene to para-nitrotoluene.

*Example IV*

To illustrate the enhancement of a dinitro substituted compound in which the nitro substituents are on carbon atoms other than in a para position, an experiment was performed in which 40.5 g. (0.315 mole) of naphthalene was charged to a stainless steel turbomixer autoclave which contained 22 g. of sodium fluoride. The autoclave was sealed and cooled to a temperature of about 0° C. Following this, 204 g. of hydrogen fluoride, anhydrous in nature, was charged to the reactor, the catalyst phase being such that it contained 9.7% sodium fluoride. The temperature was maintained in a range of from 0° to 8° C. while 20 g. of a 70% nitric acid solution was added thereto in four increments. The addition of the nitric acid plus an additional stirring time was completed during 64 minutes. It is to be noted that the mole ratio of naphthalene to nitric acid at this point was approximately 1:1. At the end of the desired reaction time, the autoclave was opened and the solid products, after water dilution of the hydrogen fluoride, were filtered, water washed and dried. The product consisted of a light cream solid which was easily recoverable from the reactor. Infrared analysis of the solid disclosed the presence of 55 weight percent of 1,8-dinitronaphthalene, 23 weight percent of 1,5-dinitronaphthalene, 8 weight percent of other polynitronaphthalene and 9 weight percent of unreacted naphthalene. The 1,8- isomer which was recovered had a melting point of from 170–172° C. which corresponded to the melting point found in the literature. The melting point of the 1,5- isomer, that is 214°–216° C., also corresponded to the melting point of the 1,5- isomer which was found in the literature.

*Example V*

An experiment similar to that set forth in Example IV above was performed in which 20.3 g. of naphthalene were placed in an autoclave which was then sealed. The autoclave was then cooled to a temperature of about 0° C. and 203 g. of anhydrous hydrogen fluoride added thereto. The temperature of the reactor was maintained in a range of from about 0° to about 4° C. while 30 g. of a 70% nitric acid solution was slowly added thereto in four increments. The addition of the acid plus further stirring period took 128 minutes. At the end of this time, the reaction product was recovered and treated in a manner similar to that hereinbefore set forth. Infrared analysis of the solid disclosed the presence of 40 weight percent of 1,8-dinitronaphthalene, 32 weight percent of 1,5-dinitronaphthalene and 28 weight percent of other polynitronaphthalenes.

It is thus readily apparent from the results set forth in Examples III and IV above that the process of the present invention in which an alkali metal fluoride such as sodium fluoride is present in the nitration catalyst system will result in obtaining a greater yield of a 1,8-dinitronaphthalene with a corresponding decrease in the yield of a 1,5-dinitronaphthalene, the latter compound comparing to a para isomer of a disubstituted aromatic compound.

*Example VI*

In this example, 156 g. (1.0 mole) of bromobenzene is placed in an apparatus similar to that described in the above examples. The autoclave is cooled to a temperature of about −60° C. by means of a Dry-Ice/acetone bath. In addition, the autoclave also contains 22 g. of potassium fluoride. At this point, 210 g. of anhydrous hydrogen fluoride is charged to the reactor following which 28 g. of a 70% nitric acid solution is added in increments, a time interval being allowed to elapse between the addition of each increment so that the temperature of the reaction, which is exothermic in nature, is controlled within a predetermined limit. Upon completion of the addition of the nitric acid the reaction mixture is stirred for an additional period of time so that the total contact time is 1 hour in duration. At the end of this time, the reaction product is recovered and treated in a manner similar to that set forth in Example I above. Infrared analysis of the product disclosed the presence of a predominant proportion of o-nitrobromobenzene and a minor proportion of p-nitrobromobenzene.

*Example VII*

In this example, 50 g. of diphenylether and 22 g. of lithium fluoride are placed in a turbomixer autoclave which is thereafter cooled in an icebath to a temperature of 0° C. At this point, 212 g. of anhydrous hydrogen fluoride is pressured in. The mixture is continuously stirred while 20 g. of a 100% nitric acid solution is added thereto in four increments, the temperature of the solution being maintained at approximately 0° C. during the addition of the acid. The solution is maintained at a temperature in the range of from about 0° C. to about 10° C. for a total contact time of about 1 hour. At the end of this time, the product is recovered, extracted with benzene, washed with water and neutralized. The desired product is analyzed by infrared, there being recovered a predominant proportion of 2,2'-dinitrodiphenylether with minor amounts of 2,4'-dinitrodiphenylether and 4,4'-dinitrodiphenylether.

We claim as our invention:

1. A process for the enhancement of the orthonitration of a nitratable aromatic compound which comprises treating said aromatic compound with a nitrating agent in the presence of hydrogen fluoride and an alkali metal fluoride at nitrating conditions which include a temperature in the range of from about −75° to about 30° C., and recovering the resultant nitrated aromatic compound.

2. The process as set forth in claim 1, further characterized in that said nitrating agent comprises nitric acid.

3. The process as set forth in claim 1, further characterized in that said alkali metal fluoride comprises sodium fluoride.

4. The process as set forth in claim 1, further characterized in that said alkali metal fluoride comprises potassium fluoride.

5. The process as set forth in claim 1, further characterized in that said alkali metal fluoride comprises lithium fluoride.

6. The process as set forth in claim 1, further characterized in that said aromatic compound comprises chlorobenzene and said resultant nitrated aromatic compounds comprise a major portion of o-nitrochlorobenzene and a minor portion of p-nitrochlorobenzene.

7. The process as set forth in claim 1, further characterized in that said aromatic compound comprises bromobenzene and said resultant nitrated aromatic compounds comprise a major portion of o-nitrobromobenzene and a minor portion of p-nitrobromobenzene.

8. The process as set forth in claim 1, further characterized in that said aromatic compound comprises naphthalene and said nitrated aromatic compounds comprise a major portion of 1,8-dinitronaphthalene and a minor portion of 1,5-dinitronaphthalene.

9. The process as set forth in claim 1, further characterized in that said aromatic compound comprises toluene and said nitrated aromatic compounds comprise a major portion of o-nitrotoluene and a minor portion of p-nitrotoluene.

10. The process as set forth in claim 1, further characterized in that said aromatic compound comprises diphenylether and said nitrated aromatic compounds comprise a major portion of 2,2'-dinitrodiphenylether and a minor portion of 4,4'-dinitrodiphenylether.

References Cited

Simons et al., J. Am. Chem. Soc., vol. 63, pp. 608–9 (1941).

Vorozhtsov, Jr., et al., J. Gen. Chem. (U.S.S.R.), vol. 27, pp. 1741 to 1744 (1957).

CARL D. QUARFORTH, *Primary Examiner.*

L. A. SEBASTIAN, *Assistant Examiner.*